United States Patent Office 3,334,034
Patented Aug. 1, 1967

3,334,034
ELECTROLYTIC METHOD FOR THE RECOVERY
OF NICKEL AND COBALT
Charles Geldzahler and George S. Grossman, Chicago, Ill., assignors to Nickalloy, Inc., a corporation of Illinois
No Drawing. Filed Feb. 4, 1964, Ser. No. 342,539
12 Claims. (Cl. 204—112)

This invention relates to a process for the recovery of nickel or cobalt. More particularly, it relates to an electrolytic method for recovering nickel and cobalt of high purity from solution containing one or more metallic contaminants.

In accordance with the present invention, nickel or cobalt is recovered either in the form of metal or metal solutions of high purity from nickel-bearing or cobalt-bearing material which may contain varying amounts of metal impurities or contaminants such as copper, iron, aluminum, magnesium, chromium, zinc, manganese and the like. In this process, an aqueous acid solution of metals is electrolyzed utilizing a suitable anode, usually consisting primarily of nickel or cobalt, under conditions of current density inhibiting cathode deposition of the nickel or the cobalt, whichever is the predominant metal in solution, so that with the lowering of the acidity, i.e., increasing of the pH of the solution to above about 4.2 metal contaminants including iron precipitate and a purified solution is obtained.

When the starting material is in nickel-bearing or cobalt-bearing material containing substantial amounts of copper, say about 0.3%, the starting solution must be subjected to a preliminary electrolysis to reduce the copper content to values less than 0.3% and as close to 0% as practicable. In this preliminary electrolytic treatment, the copper is recovered as powder following which the residual electrolyte or acidic solution is subjected to the purifying electrolytic treatment referred to above. In a preliminary electrolytic step to remove copper, any carbon and silicon present are precipitated from the acidic solution of metals along with the copper. This precipitated material may be separated from the acidic solution of metals, for example, by filtration.

During the electrolysis operation for the purification of the acidic solution of metals, an anode of metal non-contaminating to the solution goes into solution in the electrolyte thereby decreasing the free acidity, i.e., raising the pH of the electrolyte. Solutions of metals obtained, for example, by dissolving nickel or cobalt base alloys in acidic electrolyte solution will usually have a pH less than 4 and preferably a pH below 2. As the electrolysis proceeds, if no steps are taken to maintain a low acid pH, the acidity of the solution decreases and the pH of the electrolyte increases. During the electrolysis at current densities sufficiently high to inhibit deposition of nickel or cobalt at the cathode, the pH increases relatively rapidly and when acidities in the pH range beween 4.2 and about 6.8 are attained, precipitation of impurities such as iron, aluminum, magnesia, etc., is effected.

Substantially all of the impurities are precipitated from solution in the electrolyte by continued treatment at a pH in the lower portion of the range or by treatment for a lesser period when the pH is in the intermediate portion of the range or by treatment for a period sufficient to attain a pH in the range of 6.5 to 6.8. Above a pH of 6.8, the nickel or cobalt in solution tends to precipitate from the electrolyte in the form of salts. Hence, in carrying out the process of the present invention, it is best to control the pH so that it is maintained in the range between 4.2 and 6.8. Need to minimize losses of nickel and cobalt in the form of precipitated salts, renders such a mode of operation economically undesirable.

It has been known heretofore that scrap metal will go into solution when it is used as an anode in an electrolytic cell having, for example, a strongly acidic solution as the starting electrolyte. It has also been taught heretofore that the solution of metals formed by the electrolytic dissolution of an anode in acid solution can be treated chemically to precipitate iron and copper as carbonates or by neutralizing the solution and following the neutralization with a blowing operation with air to oxidize and precipitate the iron as an insoluble ferric compound.

In the process of this invention, illustrated with reference to the recovery of nickel, metal scrap is utilized as the anode in an electrolytic cell which contains predominantly an aqueous solution of acid which forms soluble salts of nickel. In this operation, acid is consumed by reaction of the anode where copper, iron, zinc, etc., form soluble salts and the insoluble salts of arsenic, tin, etc., precipitate as a so-called slime which is collected in an acid resistant bag of fibers such as the synthetic fiber formed from the copolymer of acrylonitrile and vinyl chloride known as "Dynel." The cathode used in this operation may be silver, gold, iron, carbon, steel or other conducting metal including copper. The preferred cathode is stainless steel because when copper is present in the starting solution, the copper separated therefrom, at the cathode is non-adherent and accumulates as a mass of powder adjacent the bottom of the cathode.

The electrolyte may be any suitable aqueous acid solution capable of forming a soluble salt of nickel or cobalt and exhibiting a pH less than 4 and preferably a pH of less than 2. Best results are obtained when the electrolyte contains a minimum of 0.1% of chlorine ion in the form of hydrochloric acid. The preferred electrolyte is an aqueous acid solution such as aqueous hydrochloric acid and aqueous solutions of sulfuric acid, phosphorous acid, phosphoric acid, fluoboric acid and the like, preferably in admixture with a small amount of hydrochloric acid.

If the electrolyte is, for example, sulfuric acid solution, copper enters the solution as copper sulfate and migrates to the cathode of the electrolytic cell where copper deposits as a non-adherent powder and may be recovered in a relatively pure form. Efficient dissolution of the anode and removal of copper at the cathode may be simultaneously attained when the pH of the acid being formed does not exceed 4 and D.C. electrical current is passed through the solution, preferably while using a cathode or cathodes of such dimensions that a cathode current density in the range of approximately 144 and 720 amperes per square foot of cathode surface is maintained.

When the nickel content of the solution formed in the electrolytic anode dissolution operation reaches a concentration of, for example, 50 grams per liter, the anode may be changed and the current density adjusted, if necessary, to carry out the solution purification operation or the solution may be transferred to an electrolytic cell for production of a nickel solution of high purity. Nickel solutions containing greater or lesser concentrations of nickel may be treated to effect purification, for example, solutions containing 25 to 75 grams per liter of nickel, but solutions containing the lower concentrations are less efficient in their utilization of electricity and solutions of higher concentration require careful control to avoid loss of nickel in the precipitate of impurities.

It is to be understood that, if the starting material is a nickel-containing solution, substantially free of copper or containing insubstantial amounts of copper, i.e., amounts below about 0.3%, the process constitutes essentially the electrolytic step for the production of a nickel solution of high purity.

When treating a nickel and impurity-containing electrolyte in the electrolytic cell to purify the same, the anode is an essentially copper-free anode of relatively pure nickel or cobalt depending upon the metal being recovered. While the anode may contain in appreciable quantities, elements other than nickel or cobalt which can be precipitated during the electrolytic purification process, such as iron, anodes made of commercially pure nickel or cobalt which consists of 99% of these metals are preferred. The anode goes into solution in the electrolyte thereby decreasing the free acidity thereof. The pH of this electrolyte at the start of the electrolysis generally is in the range between about pH 2 and pH 4. The electrolysis is continued until the pH is in the range between 4.2 and about 6.8 preferably in the pH range between about 5.5 and 6.5.

In accordance with the preferred aspects of the present process, the anode should be free of or substantially free of copper. Amounts of copper of about 0.2% to 0.3% may be tolerated, but it is preferred that no more than a trace of copper be present in the anode.

One of the effects of the electrolysis of the nickel-containing solution when at a pH in the range between 4.2 and 6.8 is that metals which exhibit more than one oxidation state and are present in the solution in the lower state, are oxidized to the higher state. For example, ferrous ions are converted to ferric ions in the anode and subsequently precipitate as ferric hydroxide.

In carrying out the electrolysis step at a pH in the stated range, the deposition of nickel or cobalt and consequent loss of valuable components in the precipitate of impurities is inhibited by passing direct current between the electrodes under conditions to maintain a current density at the cathode in excess of 1 ampere per square inch of cathode surface. In general, current densities in the range between 1 ampere per square inch and 10 amperes per square inch of cathode surface are useful because they serve to minimize nickel deposition. Preferably, current densities in the range between about 1.5 amperes and 5 amperes per square inch of cathode surface are used.

Iron and/or other metal salts precipitated from the electrolyte in this electrolysis at a pH in the range between about 4.2 and about 6.8 are removed as by filtration. The filtrate is a solution of the relatively pure nickel or cobalt salts which may then be crystallized to recover the salts, if desired.

The invention will be fully understood from the following detailed description of an illustrative embodiment of the process wherein the scrap metal containing nickel to be recovered is Monel metal, an alloy of 67% nickel, 28% copper and the balance manganese and iron.

*Example*

An electrolytic cell was set up as follows:

An aqueous electrolyte containing 50 g./l. of sulfuric acid and 0.5 g./l. of hydrochloric acid was poured into a cell equipped with a stainless steel cathode and an anode made of Monel metal. A direct current source was applied to the electrolyte at a cathode current density of 2 amperes per square inch of cathode surface. The temperature of the electrolyte at the start of the electrolysis was 70° F. and this temperature rose to 140° F. during the electrolysis. The electrolysis was continued and the acidity maintained at the above concentration by the addition of acid, until the nickel concentration of the electrolyte solution was 50 g./l., at which time the electrolysis was discontinued. It was found that copper metal was present as a finely divided mass in the vicinity below the cathode and the copper was filtered from the electrolyte.

The filtrate contained 50 g./l. of sulfuric acid, 0.5 g./l. of hydrochloric acid, 50 g./l. of nickel as nickel sulfate, and minor amounts of iron, aluminum and manganese in solution, as impurities. This filtrate was poured into an electrolyte cell equipped with an anode made from commercially pure nickel and a cathode made from copper. A direct current source was applied to the electrolyte at a cathode current density of 1 ampere per square inch of cathode surface. The electrolysis was continued until a pH of 6.5 in the electrolyte was attained. The electrolysis was then discontinued and the electrolyte solution filtered to remove the insoluble hydroxides and basic salts of the iron and other metal impurities. The filtrate was evaporated to effect crystallization of the nickel sulfate. The crystallized salt, without recrystallization, was pure and suitable for commercial use.

In a similar operation commercially pure crystallized cobalt sulfate was obtained from stellite, a cobalt alloy, contaminated with copper.

It is to be understood that the present invention is not to be restricted to the details of the illustrative example since these details may be varied as noted above and as will be apparent to a skilled worker in the art. Thus, for example, the filtrate from the main electrolytic process may be evaporated to minimal liquid volume and spray-dried or the filtrate from the main electrolytic process may be electrolyzed under conditions to plate out the nickel content of the solution on a nickel cathode thereby recovering solid pure nickel metal.

We claim:

1. A method of recovering a high purity metal of the class consisting of nickel and cobalt from a solution of a member of the class of nickel-bearing and cobalt-bearing material containing at least one other metal including copper in amounts less than 0.3% and iron, as impurities, said method comprising conducting electrolysis of said solution with an anode of metal consisting primarily of nickel or cobalt at a cathode current density in the range between about 1 ampere/square inch and 10 amperes/square inch and at a pH in the range between about 4.2 and about 6.8, thereby effecting precipitation of said impurities including iron and separating the precipitated matter from the residual electrolyte.

2. A method of recovering a high purity metal of the class consisting of nickel and cobalt from a strongly acidic solution of a member of the class of nickel-bearing and cobalt-bearing material containing at least one other metal including copper in amounts less than 0.3% and iron, as impurities, said method comprising conducting electrolysis of said solution with an anode of metal consisting primarily of nickel or cobalt at a cathode current density in the range between about 1 ampere/square inch and 10 amperes/square inch until the pH of the strongly acidic solution rises to a pH in the range between about 4.2 and about 6.8, thereby effecting precipitation of said impurities including iron and separating the precipitated matter from the residual electrolyte.

3. A method of recovering a high purity metal of the class consisting of nickel and cobalt from a solution of a member of the class of nickel-bearing and cobalt-bearing material containing at least one other metal including copper in amounts less than 0.3% and iron, as impurities, said method comprising passing D.C. electric current through an electrolyte in contact with said material acting as an anode and an electrically conductive material as the cathode, said electrolyte comprising aqueous acid solution capable of forming soluble salts with nickel and cobalt, maintaining the resulting electrolyte solution at a pH below 4 to form an electrolyte solution of acid soluble material present in said anode, continuing the electrolysis of said electrolyte solution with an anode of metal consisting primarily of nickel or cobalt at a current density at the cathode in the range between 1 ampere/square inch and 10 amperes/square inch until the pH of said solution rises to a pH in the range between about 4.2 and about 6.8, thereby effecting a precipitation of said impurities including iron and separating the precipitated matter from the residual electrolyte.

4. A method of recovering a high purity metal of the class consisting of nickel and cobalt from nickel-bearing and cobalt-bearing material containing at least one other metal including copper and iron, as impurities, said method comprising passing D.C. electric current through an electrolyte in contact with said material acting as an anode and an electrically conductive material as the cathode, said electrolyte comprising an aqueous solution capable of forming soluble salts with nickel and cobalt, continuing said passage of current while maintaining the electrolyte at a pH below 4 to effect solution of said desired metal and said metal impurities in said electrolyte and deposition of the copper at the cathode to limit the copper content of the solution to less than 0.3%, separating the deposited copper and associated matter from the electrolyte, conducting electrolysis of the resulting solution with an anode of metal free from amounts of copper in excess of about 0.2 to 0.3%, at a cathode current density in the range between 1 ampere/square inch and 10 amperes/square inch until the pH of the electrolyte falls in the range between 4.2 and 6.8, thereby effecting precipitation of said impurities including iron and separating the precipitated matter from the residual electrolyte.

5. A method of recovering a high purity metal of the class consisting of nickel and cobalt from nickel-bearing and cobalt-bearing material containing at least one other metal including copper and iron, as impurities, said method comprising passing D.C. electric current through an electrolyte in contact with said material acting as an anode and an electrically conductive material as the cathode, said electrolyte comprising an aqueous solution capable of forming soluble salts with nickel and cobalt, continuing said passage of current while maintaining the electrolyte at a pH below 4 to form an electrolyte solution of acid soluble material present in said anode and to effect deposition of the copper at the cathode to limit the copper content of the solution to less 0.3%, separating the deposited copper and associated matter from the electrolyte, conducting electrolysis of the resulting solution with an anode of metal free from amounts of copper in excess of about 0.2 to 0.3%, at a cathode current density in the range between 1 ampere/square inch and 10 amperes/square inch until the pH of the electrolyte falls in the range between 5.5 and 6.5, thereby effecting precipitation of said impurities including iron and separating the precipitated matter from the residual electrolyte.

6. A method of recovering a high purity metal of the class consisting of nickel and cobalt from nickel-bearing and cobalt-bearing material containing at least one other metal including copper and iron, as impurities, said method comprising passing D.C. electric current through an electrolyte in contact with said material acting as an anode and an electrically conductive material as the cathode, said electrolyte comprising an aqueous solution capable of forming soluble salts with nickel and cobalt, continuing said passage of current while maintaining the electrolyte at a pH below 2 to form an electrolyte solution of acid soluble material present in said anode, continuing the electrolysis to effect solution of said desired metal and said metal impurities in said electrolyte and deposition of the copper at the cathode to limit the copper content of the solution to less than 0.3%, separating the deposited copper and associated matter from the electrolyte, conducting electrolysis of the resulting solution with an anode of metal free from amounts of copper in excess of about 0.2 to 0.3%, at a cathode current density in the range between 1 ampere/square inch and 10 amperes/square inch until the pH of the electrolyte falls in the range between 4.2 and 6.8, thereby effecting precipitation of said impurities including iron and separating the precipitated matter from the residual electrolyte.

7. A method of recovering a high purity metal of the class consisting of nickel and cobalt from nickel-bearing and cobalt-bearing material containing at least one other metal including copper in amounts less than 0.3% and iron, as impurities, said method comprising passing D.C. electric current through an electrolyte in contact with said material acting as an anode and an electrically conductive material as the cathode, said electrolyte comprising an aqueous solution capable of forming soluble salts with nickel and cobalt and containing in excess of 0.1% chlorine ions, continuing said passage of current while maintaining the electrolyte at a pH below 4 to effect solution of said desired metal and said metal impurities in said electrolyte and deposition of the copper at the cathode, separating the deposited copper and associated matter from the electrolyte, conducting electrolysis of the resulting solution with an anode of metal free from amounts of copper in excess of about 0.2 to 0.3%, at a cathode current density in the range between 1 ampere/square inch and 10 amperes/square inch until the pH of the electrolyte falls in the range between 4.2 and 6.8, thereby effecting precipitation of said impurities including iron and separating the precipitated matter from the residual electrolyte.

8. A method of recovering a high purity metal of the class consisting of nickel and cobalt from nickel-bearing and cobalt-bearing material containing at least one other metal including copper in amounts less than 0.3% and iron, as impurities, said method comprising passing D.C. electric current through an electrolyte in contact with said material acting as an anode and an electrically conductive material as the cathode, said electrolyte comprising an aqueous solution capable of forming soluble salts with nickel and cobalt, continuing said passage of current while maintaining the electrolyte at a pH below 4 to effect solution of said desired metal and said metal impurities in said electrolyte and deposition of the copper at the cathode, separating the deposited copper and associated matter from the electrolyte, conducting electrolysis of the resulting solution with an anode of metal consisting primarily of nickel or cobalt at a current density in the unscreened cathode in the range between about 1.5 amperes/square inch and 5 amperes/square inch until the pH of the electrolyte falls in the range between 4.2 and 6.8, thereby effecting precipitation of said impurities including iron and separating the precipitated matter from the residual electrolyte.

9. A method of recovering high purity nickel from a solution of a nickel-bearing material containing at least one other metal including copper in amounts less than 0.3% and iron, as impurities, said method comprising conducting electrolysis of said solution with an anode of metal consisting primarily of nickel or cobalt at a cathode current density in the range between about 1 ampere/square inch and 10 amperes/square inch and at a pH in the range between about 4.2 and about 6.8, thereby effecting precipitation of said impurities including iron and separating the precipitated matter for the residual electrolyte.

10. A method of recovering high purity cobalt from cobalt-bearing material containing at least one other metal including copper in amounts less than 0.3% and iron, as impurities, said method comprising conducting electrolysis of said solution with an anode of metal consisting primarily of nickel or cobalt at a cathode current density in the range between about 1 ampere/square inch and 10 amperes/square inch and a pH in the range between about 4.2 and about 6.8, thereby effecting precipitation of said impurities including iron and separating the precipitated matter for the residual electrolyte.

11. A method of recovering a high purity nickel from nickel-bearing material containing at least one other metal including copper and iron, as impurities, said method comprising passing D.C. electric current through an electrolyte in contact with said material acting as an anode and an electrically conducted material as the cathode, said electrolyte comprising an aqueous solution capable of forming soluble salts with nickel, continuing said passage of current while maintaining the electrolyte at a pH below 4 to form an electrolyte solution of acid soluble material present in said anode, continuing the electrolysis to effect solution of said desired metal and said metal impurities in said electrolyte and deposition of the copper at the cathode to limit the copper content of the electrolyte to less than 0.3%, separating the deposited copper and associated matter from the electrolyte, conducting electrolysis of the resulting solution with an anode of metal free from amounts of copper in excess of about 0.2 to 0.3%, at a cathode current density in the range between 1 ampere/square inch and 10 amperes/square inch until the pH of the electrolyte falls in the range between 4.2 and 6.8, thereby effecting precipitation of said impurities including iron and separating the precipitated matter from the residual electrolyte.

12. A method of recovering a high purity cobalt from cobalt-bearing material containing at least one other metal including copper and iron, as impurities, said method comprising passing D.C. electric current through an electrolyte in contact with said material acting as an anode and an electrically conducted material as the cathode, said electrolyte comprising an aqueous solution capable of forming soluble salts with cobalt, continuing said passage of current while maintaining the electrolyte at a pH below 4 to form an electrolyte solution of acid soluble material present in said anode, continuing the electrolysis to effect solution of said desired metal and said metal impurities in said electrolyte and deposition of the copper at the cathode to limit the copper content of the electrolyte to less than 0.3%, separating the deposited copper and associated matter from the electrolyte, conducting electrolysis of the resulting solution with an anode of metal free from amounts of copper in excess of about 0.2 to 0.3%, at a cathode current density in the range between 1 ampere/square inch and 10 amperes/square inch until the pH of the electrolyte falls in the range between 4.2 and 6.8, thereby effecting precipitation of said impurities including iron and separating the precipitated matter from the residual electrolyte.

References Cited

UNITED STATES PATENTS

| 1,336,765 | 4/1920 | Udy | 204—112 |
| 2,624,702 | 1/1953 | De Merre | 204—112 X |
| 3,202,593 | 8/1965 | Hardier | 204—106 |

FOREIGN PATENTS

| 569,444 | 5/1945 | Great Britain. |
| 17,114 | 10/1962 | Japan. |

JOHN H. MACK, *Primary Examiner.*

H. M. FLOURNOY, *Assistant Examiner.*